United States Patent [19]

Ono et al.

[11] Patent Number: 5,115,057

[45] Date of Patent: May 19, 1992

[54] ELECTRON-CONDUCTIVE HIGH POLYMER AND ELECTROCONDUCTIVE MATERIAL HAVING THE SAME

[75] Inventors: Shigetoshi Ono; Eiji Funatsu, both of Kanagawa, Japan

[73] Assignee: Fuji Photo Film Co., Ltd., Kanagawa, Japan

[21] Appl. No.: 548,648

[22] Filed: Jul. 5, 1990

[30] Foreign Application Priority Data

Jul. 4, 1989 [JP] Japan .................................. 1-172412
Jul. 7, 1989 [JP] Japan .................................. 1-176447

[51] Int. Cl.⁵ .................. C08F 228/06; C08F 226/06; C08F 226/00; C08F 228/02; C08F 216/12; C08F 12/02; C08F 12/28; H01M 6/18; H01M 2/16

[52] U.S. Cl. .................................. 526/256; 526/258; 526/270; 526/287; 526/288; 526/310; 526/333; 526/346; 429/192; 429/249

[58] Field of Search ............................. 526/288

[56] References Cited

U.S. PATENT DOCUMENTS 3,814,703  6/1974  Nakayama et al. .
4,385,164  5/1983  Sinclair et al. .................. 526/201
4,540,762  9/1985  Turner ........................... 526/262

FOREIGN PATENT DOCUMENTS 2139926  5/1976  France .

*Primary Examiner*—Joseph L. Schofer
*Assistant Examiner*—Wu C. Cheng
*Attorney, Agent, or Firm*—Sughrue, Mion, Zinn, Macpeak & Seas

[57] ABSTRACT

Disclosed is an electron-conductive high polymer, which has at least (1) an ethylenic repeating unit having an electron-conductive site comprising at least one of aniline compounds and heterocyclic compounds as the repeating unit in the side chain and (2) an ethylenic repeating unit having an anionic group in the side chain and/or an ethylenic repeating unit having a repeating unit of an oxyalkylene group in the side chain. As having excellent electroconductivity, mechanical strength and shapability, the high polymer is laminated with a solid polyelectrolyte or with a separator to prepare an electroconductive material usable as a battery material.

14 Claims, 1 Drawing Sheet

ELECTRON-CONDUCTIVE HIGH POLYMER AND ELECTROCONDUCTIVE MATERIAL HAVING THE SAME

FIELD OF THE INVENTION

The present invention relates to an electro-conductive material which may widely be utilized in various fields of antistatic materials for plastics, electric industrial materials, electronic industrial materials, such as electrodes or electrolytic materials for batteries, condensers, electronic devices and electrochromic elements, as well as plane heaters and electromagnetic shielding materials.

BACKGROUND OF THE INVENTION

Organic high polymer materials having an electron-conductivity have recently been investigated as to the applicability thereof to batteries and other various functional devices. For instance, polyanilines, polythiophenes, polypyrroles, polyphenylenevinylenes, polyphenyleneacetylenes and polyacetylenes are considered to be hopeful, and these are described in West German Patents 3,223,544, 3,318,856, 3,318,857, 3,325,892, 3,338,904 and 3,421,296 and JP-A-58-187432, JP-A-59-43060, JP-A-59-112583, JP-A-58-209864, JP-A-59-207933, JP-A-60-120722, JP-A-60-67527, JP-A-62-225518, JP-A-62- 53328 JP-A-63-199726, JP-A-60-223817, JP-A-61-83221 and JP-A-59-31565. (The term "JP-A" as used herein means an "unexamined published Japanese patent application".) Although these high polymers have an excellent electron-conductivity, they have some drawbacks that the mechanical strength is poor, and since the solvent-solubility is poor, the moldability and workability is poor. Therefore, electron-conductive high polymers having both an excellent electron-conductivity and an excellent moldability and workability are desired.

An electroconductive material now in use is composed of the above-mentioned electron-conductive high polymer and an electrolyte in the form of a layer. In such constitution, exchange of electron for ion at the interface between them is to be effected rapidly in order that the device or battery may sufficiently function.

As the electrolyte, a solid polyelectrolyte is preferred in view of various points that it is free from leakage of liquid, the mechanical strength is large and the flexibility of the laminate material is large. Various reports of using such a solid polyelectrolyte in the constitution of an electroconductive material have been made up to the present.

For instance, as one example of an electro-conductive electronic material comprising a combination of such a solid polyelectrolyte and an electron-conductive high polymer, *POLYMER*, 1981, vol. 22, November, pages 1454 to 1455 has disclosed an organic battery comprising a combination of a polyacetylene and a solid electrolyte. However, the battery has various problems that the film of polyacetylene as prepared by addition polymerization has a poor oxidation stability, the contact at the interface of the solid polyelectrolyte is insufficient so that a good electro-conductivity could not be obtained, and the response speed is slow as a device material.

JP-A-62-98577 has disclosed an electroconductive laminate material comprising a combination of a high polymer having a conjugated double bond in the electrolytic polymerized main chain and a solid polyelectrolyte. However, the material also has various problems that the interfacial contact between the electron-conductive high polymer and the solid polyelectrolyte is insufficient and therefore the interfacial resistance is large and the electro-conductivity of the material is not good and additionally the mechanical strength of the material is poor.

As a compound which may have both a sufficient mechanical strength and a good electroconductivity, polymers having a carbazole group-containing repeating unit in the side chain, for example, a compound of a formula:

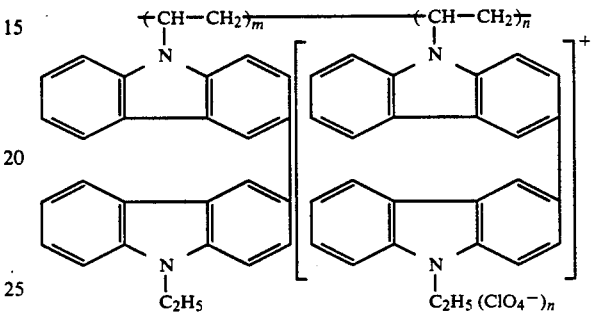

were discussed in 37th High Polymer Discussion Meeting 2H04. However, the electroconductivity of the compound was from $10^{-4}$ to $10^{-5}$ S/cm and is therefore insufficient.

Where a polyaniline or polyheterocyclic compound is used as an electrode material, anions are doped or disdoped along with the redox reaction. Takehara et al. (56th Meeting of Electrochemical Association, 3G24) have reported that the diffusion of anions is conducted at a determining speed in the procedure.

As a means of preventing the diffusion of anions, one example has been illustrated in JP-A-63-215772, where an anionic compound is used as a doping agent. However, the method has been found to disadvantageously cause the concentration gradient of the anionic compound because of the diffusion thereof after repeated doping. Therefore, the method could not be a sufficient improving means.

SUMMARY OF THE INVENTION

The first object of the present invention is to provide an electron-conductive high polymer having an excellent electron-conductivity, a high mechanical strength and an excellent moldability and workability.

The second object of the present invention is to provide an electron-conductive high polymer which may rapidly be doped and disdoped with anions in a redox reaction of the polymer.

The third object of the present invention is to provide an integrated electroconductive material composed of an electron-conductive high polymer and a solid polyelectrolyte, which has low resistance at the contact interface, an excellent electric conductivity and a rapid response speed as a device material.

The fourth object of the present invention is to provide an electroconductive material using an electron-conductive high polymer which additionally has a function of a solid polyelectrolyte, and thereby an electrolyte layer becomes unnecessary.

The objects of the present invention have been attained by an electron-conductive high polymer which has at least (1) an ethylenic repeating unit having an electron-conductive site comprising at least one of aniline compounds and heterocyclic compounds as the repeating unit in the side chain and (2) an ethylenic repeating unit having an anionic group in the side chain and/or an ethylenic repeating unit having a repeating unit of an oxyalkylene group in the side chain, and by an electroconductive material having the electron-conductive high polymer.

DETAILED DESCRIPTION OF THE INVENTION

Figure 1:
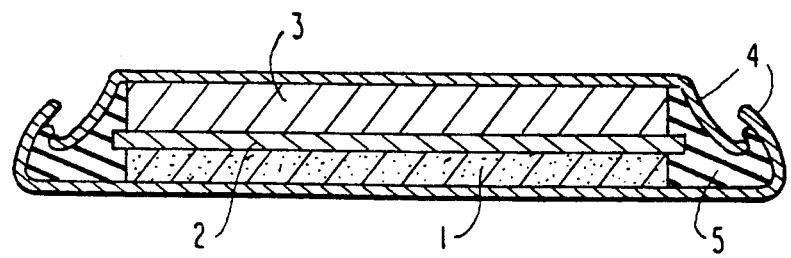
FIG. 1 is a sectional view to show the constitution of a secondary battery as prepared in the repeated charge-discharge test No. 1 of the present invention, wherein 1 represents a positive pole made of the compound of the invention, 2 represents a solid polyelectrolyte film, 3 represents a negative pole (lithium sheet), 4 represents a stainless steel case, and 5 represents an insulating synthetic rubber.

The electron-conductive high polymer of the present invention will be explained in detail below.

The electron-conductive site in the side chain, which comprises at least one of aniline compounds and heterocyclic compounds, may be composed of one or more kinds of the compounds. The plural repeating units of the electron-conductive sites, if any, may be bonded to each other via a linking group.

Ethylenic compounds which derive the ethylenic repeating unit having a repeating unit of an electron-conductive site comprising at least one of aniline compounds and heterocyclic compounds in the side chain are preferably those of the following formula (I) or (II):

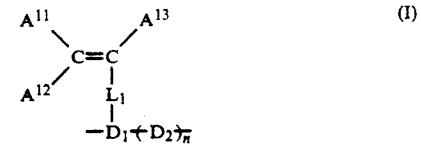

(I)

(II)

Ethylenic compounds which derive the ethylenic repeating unit having a repeating unit of an oxyalkylene group in the side chain are preferably those of the following formula (III):

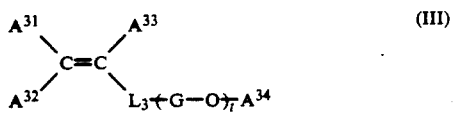

(III)

Ethylenic compounds which derive the ethylenic repeating unit having an anionic group in the side chain are preferably those of the following formula (IV):

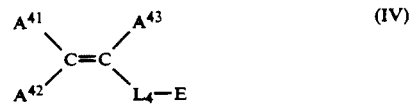

(IV)

In the formulae (I) to (IV), $A^{11}$, $A^{12}$, $A^{13}$, $A^{21}$, $A^{22}$, $A^{23}$, $A^{31}$, $A^{32}$, $A^{33}$, $A^{41}$, $A^{42}$ and $A^{43}$ may be the same or different and each represents a hydrogen atom or a substituent on the ethylene carbon; $L_1$, $L_2$, $L_3$ and $L_4$ may be the same or different and each represents a divalent linking group; $D_1$, $D_2$, $D_3$ and $D_4$ may be the same or different and each represents an aniline compound or a heterocyclic compound. a represents 0 or 1.

G represents a substituted or unsubstituted alkylene group; and t represents from 1 to 30. Where t is 2 or more, G may be the same or different.

$A^{34}$ represents a hydrogen atom, a substituted or unsubstituted alkyl, a substituted or unsubstituted aryl, a substituted or unsubstituted alkylcarbonyl, a substituted or unsubstituted arylcarbonyl, a substituted or unsubstituted alkylsulfonyl or a substituted or unsubstituted arylsulfonyl group.

Compounds of the formulae (I) to (IV) will be explained in detail below.

As preferred examples of the substituent on the ethylene carbon, which is represented by $A^{11}$, $A^{12}$, $A^{13}$, $A^{21}$, $A^{22}$, $A^{23}$, $A^{31}$, $A^{32}$, $A^{33}$, $A^{41}$, $A^{42}$ or $A^{43}$, there are mentioned a substituted or unsubstituted alkyl group having from 1 to 4 carbon atoms (e.g., methyl, ethyl, n-propyl, n-butyl, iso-propyl, methoxyethyl, carboxymethyl), a cyano group, a carboxyl group (including an alkali metal salt thereof),a carbamoyl group (which may be substituted by a substituted or unsubstituted alkyl group having from 1 to 4 carbon atoms in an alkyl moiety or a substituted or unsubstituted phenyl group, for example, —CONH$_2$, —CON(CH$_3$)$_2$, —CONC$_2$H$_4$OCH$_3$,

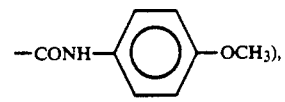

a substituted or unsubstituted alkoxycarbonyl group having from 1 to 4 carbon atoms in an alkyl moiety (e.g., —COOCH$_3$, —COOC$_2$H$_5$,

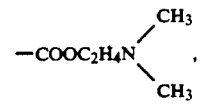

—COOC$_4$H$_9$(n—)), and a halogen atom (e.g., fluorine, chlorine, bromine).

$A^{11}$, $A^{12}$, $A^{13}$, $A^{21}$, $A^{22}$, $A^{23}$, $A^{31}$, $A^{32}$, $A^{33}$, $A^{41}$, $A^{42}$ and $A^{43}$ may be the same or different and each is especially preferably a hydrogen atom, a chlorine atom, a methyl group or a carboxyl group.

The electron-conductive site and the oxyalkylene repeating unit or an anion group are bonded to the ethylene main chain, respectively, via the linking group of $L_1$, $L_2$, $L_3$ or $L_4$ in the above-mentioned formulae.

L₁, L₂, L₃ and L₄ may be the same or different and each is represented by , where J₁, J₂ and J₃ may be the same or different and each represents

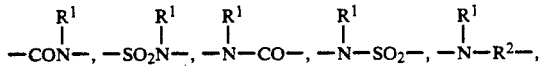

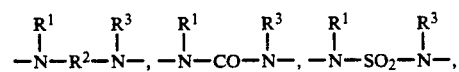

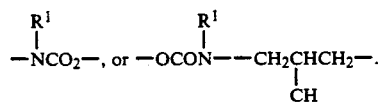

R₁ represents a hydrogen atom, or an alkyl group which may be substituted or a phenyl group which may be substituted. R² represents an alkylene group having from 1 to 4 carbon atoms. R³ represents a hydrogen atom or an optionally substituted alkyl group having from 1 to 6 carbon atoms. J₁, J₂ and J₃ are preferably selected from —CO—, —SO₂—, —CONH—, —SO₂NH—, —NH—CO—, —NH—SO₂—, —O—, —NHCONH—, —S—, —CO₂—, —OCO—, —NHCO₂—, and —OCONH—.

X₁, X₂ and X₃ may be the same or different and each represents an optionally substituted alkylene, arylene or aralkylene group, or —(G₁—O)ₜ₁—CH₂CH₂—. G₁ and t₁ have the same meanings as G and t, respectively. Preferably, they each represents an alkylene group having from 1 to 4 carbon atoms, an arylene group having from 6 to 9 carbon atoms, a substituted arylene group, or —(CH₂CH₂O)ₜ₂CH₂CH₂—. u, p, q, r and s each represent 0 or 1. t₂ has the same meaning as t.

In the formulae (I) and (II), the electron-conductive sites to be represented by D₁, D₂, D₃ and D₄ may be the same or different and each represents an aniline compound or a heterocyclic compound. The heterocyclic compound preferably includes 5- or 6-membered ring or a condensate thereof containing at least one heteroatom, such as a nitrogen atom, an oxygen atom or a sulfur atom. D₂, D₃ and D₄ are divalent, and D₁ is trivalent.

Preferred examples of hetero rings for the above-mentioned site include

pyrazole, imidazole,
triazole, oxazole (including iso-form), thiazole (including iso-form), pyridine, diazine,

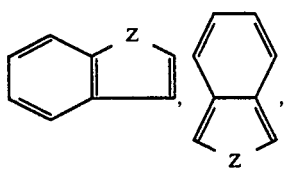

benzodiazole, benzotriazole, benzoxazole, benzothiazole, purine, quinoline, isoquinoline, benzodiazine, fluorene

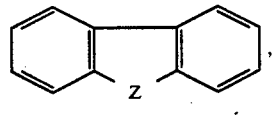

acridine,
phenazine, phenoxazine, pyrazolotriazole, pyrazolodiazole, pyrazoloazole, and benzopyrazoloazole.

Z represents —O—, —S— or

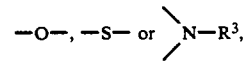

where R³ has the
same meaning as mentioned above.

Especially preferred examples or D₁, D₂, D₃ and D₄ are aniline compounds, pyrrole compounds, thiophene compounds and furan compounds.

Aniline compounds and heterocyclic compounds to be represented by D₁, D₂, D₃ and D₄ may optionally be substituted by any desired substituents. Examples of the substituents are a halogen atom, a nitro group, a cyano group, an alkyl group, an alkoxy group, —NHCOR⁴,

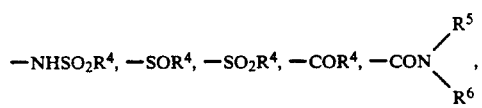

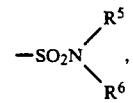

an amino group (which may optionally be substituted by alkyl group(s)), a hydroxyl group and a group of forming a hydroxyl group by hydrolysis. R⁴ represents an alkyl group, a phenyl group or an aralkyl group. R⁵ and R⁶ may be the same or different and each represents a hydrogen atom, an alkyl group, a phenyl group or an aralkyl group. Two substituents on the compound may be condensed to form a carbon ring or a hetero ring.

As examples of the substituents for the alkyl group, alkoxy carbonyl group, phenyl group, aryl group, an alkylcarbonyl group, an arylcarbonyl group, an alkylsulfonyl group and an arylsulfonyl group, represented by D₁, D₂, D₃ and D₄ and those represented by A¹¹, A¹², A¹³, A²¹, A²², A²³, A³¹, A³², A³³, A³⁴, A⁴¹, A⁴² and A⁴³ as well as examples of the substituents for the alkylene group, arylene group or aralkylene group represented by X₁, X₂ or X₃ and examples of the substituents for the alkylene group represented by G, there are mentioned a hydroxyl group, a nitro group, an alkoxy group having from 1 to 4 carbon atoms, an alkyl group having from 1 to 4 carbon amino group which may be substituted by alkyl group(s).

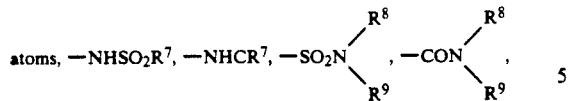

$-SO_2R^7$, $-COR^7$, a halogen atom, a cyano group, and an amino group which may be substituted by alkyl group(s).

$R^7$ has the same meaning as $R^4$. $R^8$ and $R^9$ may be the same or different and each has the same meaning as $R^5$.

Specific examples of aniline compounds and heterocyclic compounds producing the high polymers of the present invention are mentioned below, which, however, are not limited thereto.

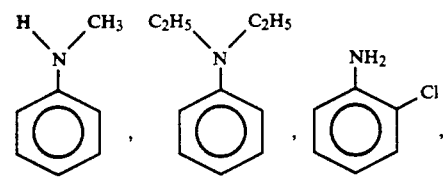

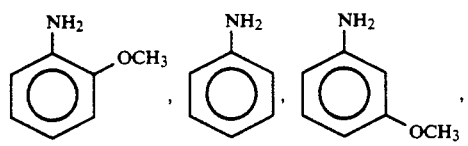

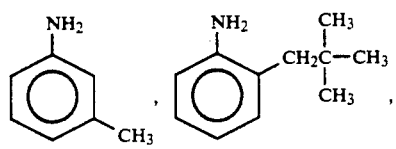

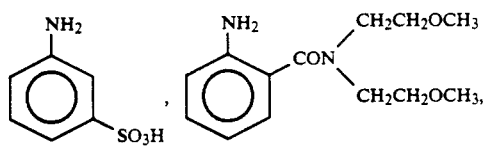

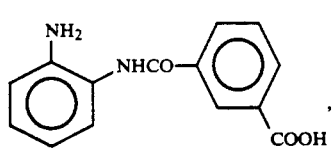

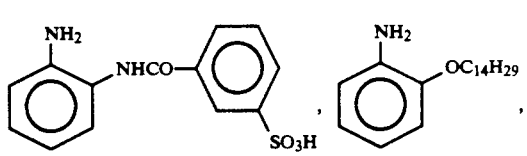

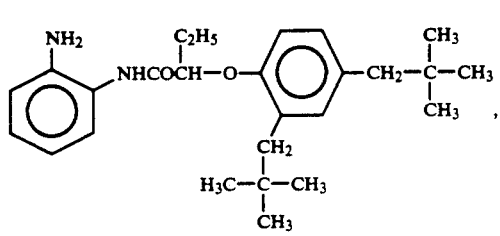

-continued

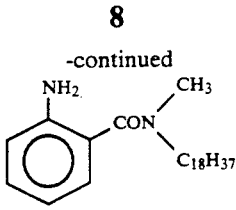

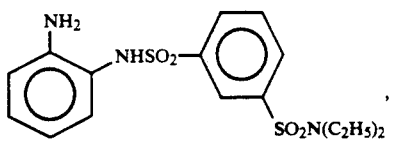

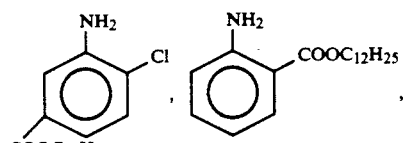

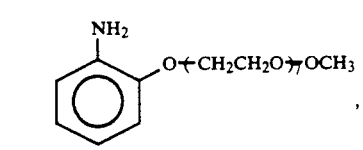

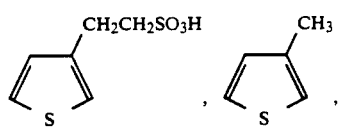

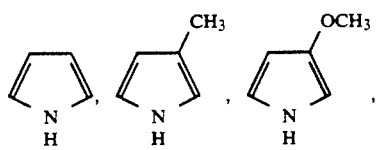

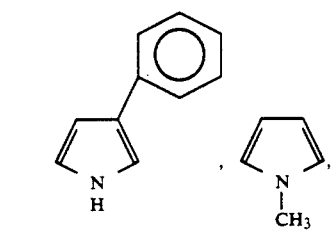
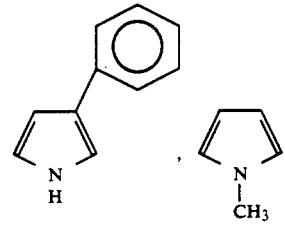

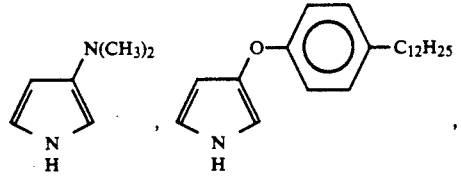

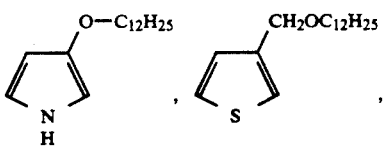

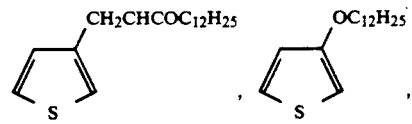

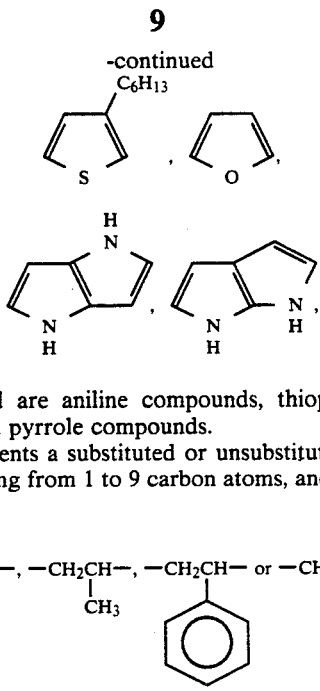

Preferred are aniline compounds, thiophene compounds and pyrrole compounds.

G represents a substituted or unsubstituted alkylene group having from 1 to 9 carbon atoms, and preferably —CH$_2$CH$_2$—, —CH$_2$CH—, —CH$_2$CH— or —CH$_2$CHCH$_2$—,
      |              |                  |
      CH$_3$          C$_6$H$_5$          CH Especially, ethylene group, —CH$_2$CH$_2$—, is most preferred.

t represents from 1 to 30, preferably from 2 to 20, more preferably from 3 to 15.

A$^{34}$ represents a hydrogen atom, an alkyl group(e.g., methyl,ethyl, n-propyl), an aryl group(e.g., phenyl, tolyl), an alkylcarbonyl group (e.g., methylcarbonyl, ethylcarbonyl), an arylcarbonyl group (e.g., phenylcarbonyl, 4-acetaminophenylcarbonyl), an alkylsulfonyl group (e.g., methylsulfonyl, ethylsulfonyl) or an arylsulfonyl group (e.g., phenylsulfonyl, tosyl), which may be substituted or unsubstituted and which has from 1 to 9 carbon atoms. Preferably, it is an alkyl group having from 1 to 3 carbon atoms, more preferably a methyl group.

Preferred examples of the anionic group represented by E include a carboxyl group and metal salts thereof, such as alkaline metal salts or alkaline earth metal salts thereof, a sulfonic acid group and salts thereof, a sulfuric acid group and salts thereof, and a phosphoric acid group and salts thereof.

Specific examples of repeating units to be represented by the formula (I) and (II) are mentioned below, which, however, are not limited thereto.

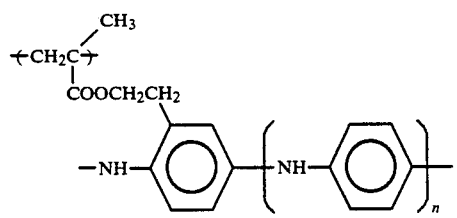

I-1

(n represents an integer 1 to 10000, and hereinafter, n represents the same meanings)

I-1

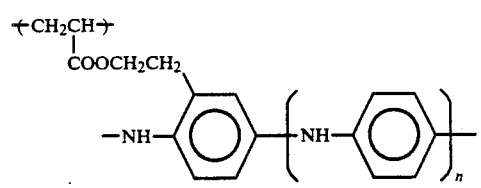

I-2

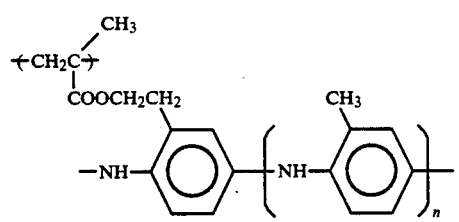

I-3

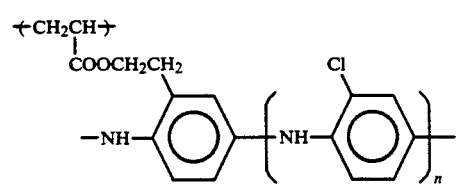

I-4

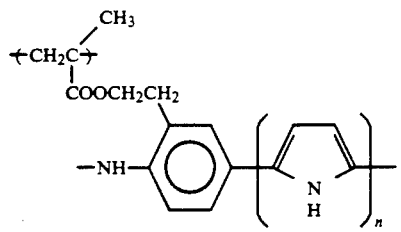
I-5
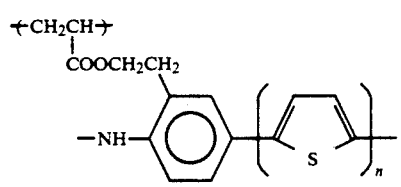
I-6
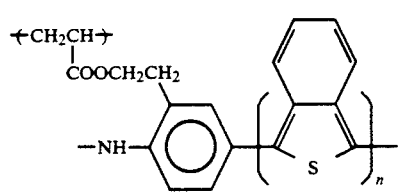
I-7
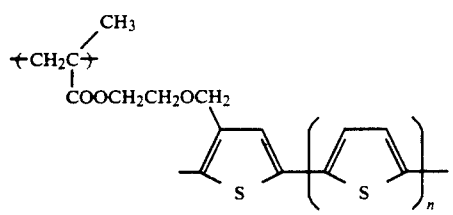
I-8
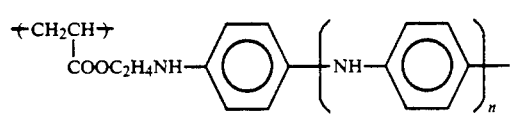
I-9
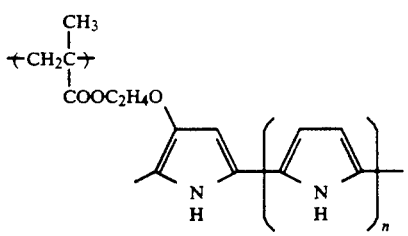
I-10
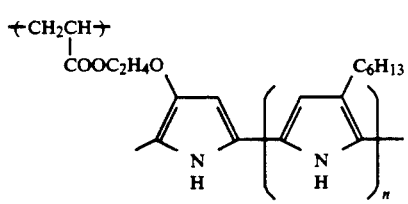
I-11
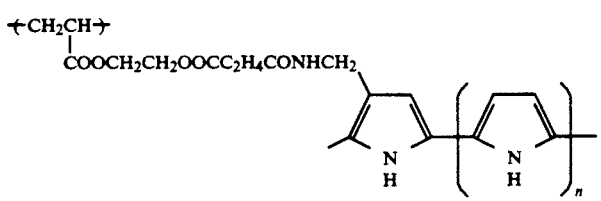
I-12

-continued
I-13
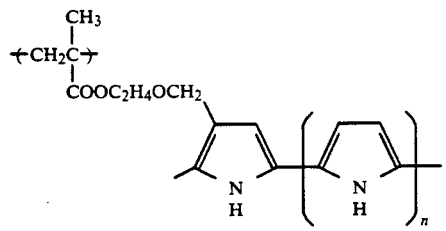
I-14
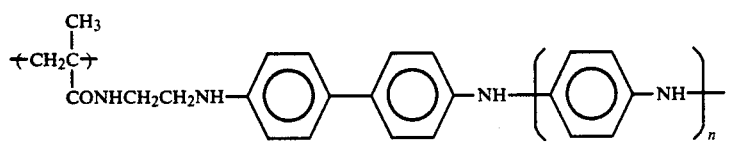
I-15
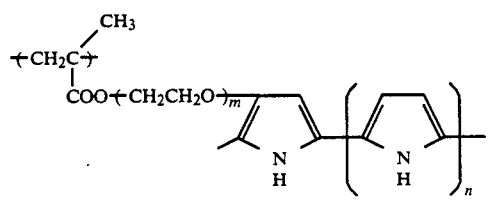
(m represents an integer, of from 1 to 30, and hereinafter m represents the same meanings)
I-16
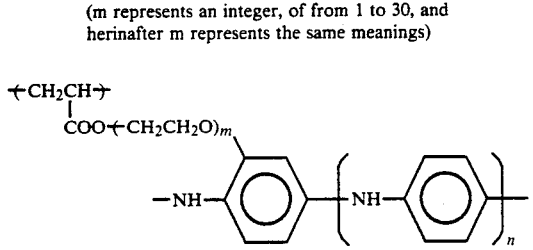
I-17
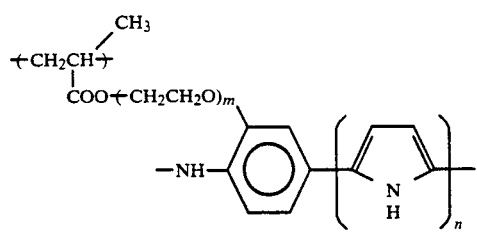
I-18
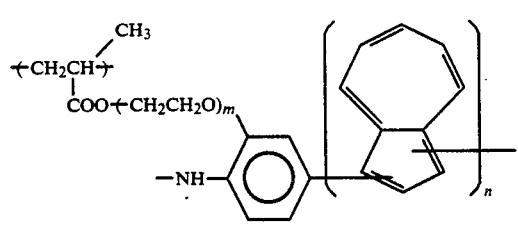
I-19
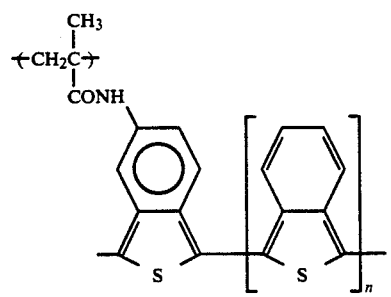

-continued

I-20

I-21

I-22

I-23

Specific examples of repeating units represented by the formula (III) are mentioned below, which, however, are not limited thereto.

III-1

$$\text{+CH}_2\text{CH+}\\\text{COO+CH}_2\text{CH}_2\text{O}\overline{\smash{)}_t}\text{CH}_3$$

| | | |
|---|---|---|
| III-2 | III-1 where | t ≐ 4 (average) |
| III-3 | " | t ≐ 7 (average) |
| III-4 | " | t ≐ 9 (average) |
| III-5 | " | t ≐ 12 (average) |
| III-6 | " | t ≐ 16 (average) |
| | | t ≐ 23 (average) |

III-7

$$\text{+CH}_2\text{C+}\\\overset{\mid}{\text{CH}_3}\\\text{COO+CH}_2\text{CH}_2\text{O}\overline{\smash{)}_t}\text{CH}_3$$

| | | |
|---|---|---|
| III-8 | III-7 where | t ≐ 4 (average) |
| III-9 | " | t ≐ 7 (average) |
| III-10 | " | t ≐ 9 (average) |
| III-11 | " | t ≐ 12 (average) |
| III-12 | " | t ≐ 16 (average) |
| III-13 | " | t ≐ 23 (average) |
| | | t ≐ 2 (average |

III-14

$$\text{+CH}_2\text{CH+}\\\text{COO+CH}_2\text{CH}_2\text{O}\overline{\smash{)}_t}\text{H}$$

t ≐ 7 (average)

III-15

$$\text{+CH}_2\text{CH+}\\\text{COO+CH}_2\text{CHO}\overline{\smash{)}_t}\text{CH}_3\\\overset{\mid}{\text{CH}_3}$$

III-16 III-5 where t ≐ 4 (average)
III-17 t ≐ 7 (average)

$$\text{+CH}_2\text{CH+}\\\text{COO+CH}_2\text{CHO}\overline{\smash{)}_{t_1}}\text{+CH}_2\text{CHO}\overline{\smash{)}_{t_2}}\text{CH}_3\\\overset{\mid}{\text{OH}}$$

$t_1 ≐ 3$ (average)
$t_2 ≐ 4$ (average)

III-18

$$\text{+CH}_2\text{C+}\\\overset{\mid}{\text{CH}_3}\\\text{COO+CH}_2\text{CHO}\overline{\smash{)}_{t_1}}\text{+CH}_2\text{CHO}\overline{\smash{)}_{t_2}}\text{CH}_3\\\overset{\mid}{\text{C}_6\text{H}_5}$$

$t_1 ≐ 3$ (average)
$t_2 ≐ 4$ (average)

III-19

$$\text{+CH}_2\text{C+}\\\overset{\mid}{\text{CH}_3}\\\text{COO+CH}_2\text{CHO}\overline{\smash{)}_t}\text{OCOCH}_3$$

t ≐ 7 (average)

III-20

$$\text{+CH}_2\text{CH+}\\\text{COO+CH}_2\text{CH}_2\text{O}\overline{\smash{)}_t}\text{OSO}_2\text{CH}_3$$

t ≐ 7 (average)

III-21

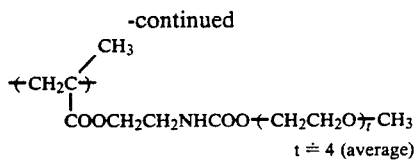
t ≒ 4 (average)

Specific examples of repeating units represented by the formula (IV) are mentioned below, which, however, are not limited thereto. In the following examples, M represents a hydrogen atom, an alkali metal (e.g., Li, Na, K), or an alkaline earth metal (e.g., Mg, Ca).

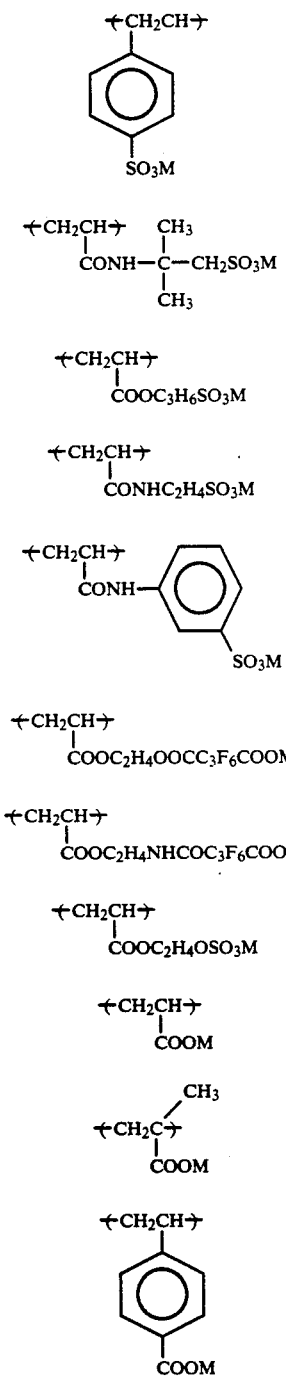

IV-1
IV-2
IV-3
IV-4
IV-5
IV-6
IV-7
IV-8
IV-9
IV-10
IV-10

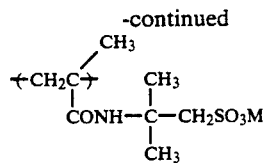
IV-11

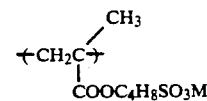
IV-12

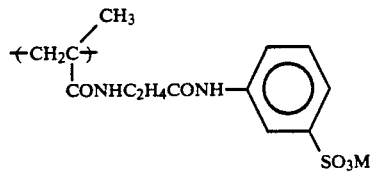
IV-13

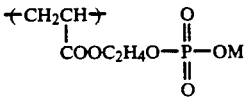
IV-14

The compounds of the present invention may further have additional repeating unit(s) of any other monomers, in addition to the repeating units of the above-mentioned formulae (I), (II), (III) and/or (IV), for the purpose of enhancing the mechanical strength and of improving the solubility.

Examples of the monomers usable for the purpose, include esters or amides derived from acrylic acid, alpha-chloroacrylic acid, alpha-alkylacrylic acid (e.g., methacrylic acid), itaconic acid, crotonic acid or citraconic acid (e.g., acrylamide, methacrylamide, n-butylacrylamide, t-butylacrylamide, diacetonacrylamide, methyl acrylate, ethyl acrylate, n-propyl acrylate, n-butyl acrylate, t-butyl acrylate, iso-butyl acrylate, 2-ethylhexyl acrylate, n-octyl acrylate, n-lauryl acrylate, methyl methacrylate, ethyl methacrylate, n-butyl methacrylate and bata-hydroxymethacrylate), vinyl esters (e.g., vinyl acetate, vinyl propionate, vinyl laurate), acrylonitrile, methacrylonitrile, aromatic vinyl compounds (e.g., styrene and derivatives thereof, such as vinyltoluene, divinylbenzene, vinylacetophenone, sulfostyrene), vinylidene chloride, vinyl alkyl ethers (e.g., vinyl ethyl ether), maleic acid esters, N-vinyl-2-pyrrolidone, N-vinylpyridine and 2- and 4-vinylpyridines. However, these examples are not limited thereto.

Any proportion of the repeating units having the above-mentioned electron-conductive site as a repeating unit in the side chain may be used in the polymer. Preferably, the proportion of the repeating units in the polymer is from 1 to 20 mol%.

Any proportion of the ethylenic repeating units having an anionic group in the side chain may be used in the polymer, Preferably, the proportion of the repeating units in the polymer is from 5 to 80 mol%.

Any proportion of the ethylenic repeating units having a repeating unit of an oxyalkylene group in the side chain may be used in the polymer. Preferably, the proportion of the repeating units in the polymer is from 5 to 99 mol%.

For producing the electron-conductive high polymer of the present invention, any known production methods may be employed. For example, the polymer may be produced by a known polymerization method, chemical oxidative polymerization method, electrolytic oxidative polymerization method, or C-C coupling reaction method.

As one example, polymerization of the main chain is first effected so that the resulting polymer may have an electron-conductive site in the side chain and anion groups and/or repeating units of oxyalkylene group in the side chain, and then the electron-conductive site is polymerized by chemical oxidative polymerization, electrolytic oxidative polymerization or C-C coupling reaction to obtain the compound of the present invention. In the process, the latter polymerization may be effected at different electron-conductive sites. As another example, polymerization of the electron-conductive site is first effected by chemical oxidative polymerization, electrolytic oxidative polymerization or C-C coupling reaction and then the side chain having the electron-conductive site-repeating units may be introduced into the main chain of the polymer having anion groups and/or repeating units of oxyalkylene group in the side chain, by high polymer reaction. As still another example, polymerization of the main chain may be effected by the use of prepolymers obtained by polymerization of electron-conductive sites by chemical oxidative polymerization, electrolytic oxidative polymerization or C-C coupling reaction, and monomers having anion groups in the side chain and/or monomers having repeating units of oxyalkylene group in the side chain. In the process to obtain the electron-conductive high polymer of the present invention, the polymerization of main chain may be carried out by copolymerization with any monomers other than monomers to provide repeating units of electron-conductive site in the side chain, and monomers having anion groups in the side chain and/or monomers having repeating units of oxyalkylene group in the side chain.

The above-mentioned chemical oxidative polymerization is effected by dissolving or dispersing a monomer compound in water or in any desired organic solvent (which may optionally contain water) and then gradually and dropwise adding a solution containing a catalyst (oxidizing agent) to the resulting solution or dispersion at 60° C. to −20° C., preferably at 20° C. to 0° C. In the case, a pertinent dispersing agent or surfactant may be employed to give an aqueous dispersion containing the polymer formed. The polymer thus formed preferably has an excellent moldability and workability..

The above-mentioned electrolytic oxidative polymerization is effected by a constant voltage method, constant potential method or constant current method, where a monomer compound and a conductive salt are dissolved or dispersed in water or in an organic solvent capable of dissolving the conductive salt, and positive and negative poles are dipped in the resulting solution or dispersion at 80° C. to −20° C., preferably at 30° C. to 0° C. Preferred is the constant voltage method, as is disclosed in *Conductive High Polymer*, page 72, edited by Naoya Ogata, published by Kodansha Scientific (1990).

The above-mentioned C—C coupling reaction is essentially applied to thiophene compounds, though it may also be applied to aniline compounds and pyrrole compounds. For instance, a halogenated thiophene compound is reacted with a Grignard reactant or a metal halide to obtain the compound of the present invention. The reaction is concretely described in, for example, *Synthesis Metal*, 26, 267 (1988). The compound of the present invention may optionally be doped with any desired dopant (for example, a halogen or a salt to be used in the above-mentioned polymerization step).

As the catalyst to be used in the chemical oxidative polymerization method, there are mentioned, for example, chlorides such as ferric chloride or cupric chloride, sulfates such as ferric sulfate or cupric sulfate, metal oxides such as lead dioxide or manganese dioxide, peroxides such as potassium persulfate, ammonium persulfate or hydrogen peroxide, quinones such as benzoquinone, halogens such as iodine or bromine, as well as potassium ferricyanide. Specific examples of the catalysts are described, for example, in JP-A-63-213518, JP-A-63-193926, JP-A-62-116665, JP-A-62-104832, JP-A-63-215717, JP-A-63-69823, JP-A-63-101415, and JP-A-60-58430. The amount of the catalyst to be used in the reaction varies, depending upon the characteristic of the monomer compound and the catalyst to be used, but it may be within the range of from 0.01 to 10 as the molar ratio of catalyst/monomer compound.

As the electrode material to be used in the electrolytic oxidative polymerization method, there are mentioned, for example, metal electrodes (e.g., Au, Pt, Ni, Cu, Sn, Zn, Ag, Ru, stainless steel), carbon electrodes (e.g., glassy carbon), and metal oxide containing electrodes (e.g, $SnO_2$, $In_2O_3$). It is preferred to employ additionally a reference electrode.

As the solvent usable in the chemical oxidative polymerization method and the electrolytic oxidative polymerization method, there are mentioned, for example, organic solvents such as acetonitrile, dimethylsulfate, N,N-dimethylacetamide, N,N-dimethylformamide, dimethylsulfoxide, sulforan, formamide, dimethoxyethane, propylene carbonate, dioxane, methanol, ethanol, gammabutyrolactone, nitrobenzene, tetrahydrofuran or nitromethane, or water or a mixture of them.

In polymerization by the chemical oxidative polymerization method or electrolytic oxidative polymerization method, an electroconductive compound may be added. As example of electroconductive compounds usable for the purpose, there are mentioned inorganic acids (e.g., HCl, $H_2SO_2$, $HClO_4$, $BF_4$), organic acids (e.g., sulfonic acids such as toluenesulfonic acid, trifluoromethylsulfonic acid or polystyrenesulfonic acid, or carboxylic acids such as formic acid, acetic acid or polyacrylic acid), organic bases (e.g., pyridine, triethanolamine), electroconductive salts (e.g., salts composed of an alkali metal cation such as $Li^+$, $Na^+$ or $K^+$, or $NO^+$, $NO_2^+$ cation or an onium cation such as $Et_4N^+$, $Bu_4N^+$ or $Bu_3P^+$, and a negative ion such as $BF_4^-$, $AsF_4^-$, $AsF_6^-$, $SbF_6^-$, $SbCl_6^-$, $PF_6^-$, $ClO_4^-$, $AlF_6^-$, $NiF_4^{2-}$ $ZrF_6^{2-}$, $TiF_6^{2-}$, $B_{10}Cl_{10}^{2-}$, $HSO_4^-$, $SO_4^{2-}$, $CL^-$, $Br^-$, $F^-$, $I^-$), or salts containing a sulfonate anion such as $CH_3C_6H_4SO_3^-$, $C_6H_5SO_3^-$ or $CF_3SO_3^-$, or polystyrenesulfonate or salts containing a carboxylate anion such as HCOOLi or sodium polyacrylate, or chlorides such as $FeCl_3$, or organic amine salts such as pyridine hydrochloride).

As the dispersing agent usable in the methods, there are cationic, anionic, nonionic or betain polymers and surfactants (emulsifiers). As specific examples, there are mentioned polyvinyl alcohol, polyethylene oxide, polypropylene oxide, hydroxyethyl cellulose, carboxymethyl cellulose, methyl cellulose, dextrin, polyvinyl pyrrolidone, sodium polystyrene-sulfonate, polyacrylic acid, polyacrylamide, gelatin, collagen, tertiary or quaternary ammonium site-containing polymers, oxonium salt site-containing polymers, sulfonium salt site-containing polymers, quaternary ammonium salt site-containing long-chain alkyl compounds, alkali salts of higher fatty acids (e.g., $CH_{12}H_{25}COONa$), alkylsulfates (e.g., sodium laurylsulfate), alkylsulfonates (e.g., sodium laurylsulfonate), alkylarylsulfonates (e.g., sodium dodecylbenzenesulfonate), salts of sulfosuccinates, higher amine halogenates, alkylpyridinium halides (e.g., dodecylpyridinium chloride), quaternary ammonium salts (e.g., trimethylammonium chloride), polyethylene glycol alkyl ethers, polyethylene glycol fatty acid esters, sorbitan fatty acid esters, fatty acid monoglycerides, and amino acids.

Where the dispersing agent is used, the amount of the dispersing agent may be from 1 to 300% by weight, preferably from 5 to 200% by weight, to the monomer. Where the surfactant is used, the amount thereof may be from 0.01 to 50% by weight, preferably from 0.1 to 20% by weight, to the monomer.

The aqueous dispersion may be subjected to dialysis or ultra-filtration.

The above-mentioned electroconductive compound may be added to the aqueous dispersion, or a high polymer compound such as polyvinyl acetate polymer may be blended therewith.

The electron-conductive high polymer of the present invention may be combined with a solid polyelectrolyte to form a laminate, which may be used as an electroconductive material for a polymer battery. The laminate may have plural layers each made of the electron-conductive high polymer of the present invention. The laminate may also have plural layers made of the electron-conductive high polymer of the present invention and any other known electron-conductive high polymer. Additionally, the laminate may further have one or more constitutive layers containing salts of metal ions of Group Ia or Group IIa of the Periodic Table. In any case, however, it is preferred that the solid polyelectrolyte is kept indirect contact with the electron-conductive high polymer of the present invention in the constitution of the laminate.

The solid polyelectrolyte to be used for forming the integrated(laminated) electroconductive material with the electron-conductive high polymer of the present invention may be a combination of a cation polymer, an anion polymer a polyacrylonitrile, a polyalkylene oxide polymer (e.g., PEO, PPO or PEO-containing silicon compounds or phosphagens), or a polyvinyl alcohol, and a salt. Specific examples of the substances are described in JP-A-61-256573, JP-A-61-124001, JP-A-62-20263, JP-A-62-139266, JP-A-63-241066, JP-A-63-241026, JP-A-63-135477, JP-A-63-142061, JP-A-63-130613, JP-A-60-23974, JP-A-63-136409, JP-A-63-193954, JP-A-63-186766 and JP-A-63-205364, and *Macromolecules*, Vol. 21, page 648.

As examples of the salt of constituting the solid polyelectrolyte, the electroconductive salts which may be used in polymerization of the above-mentioned chemical oxidative polymerization method or electrolytic oxidative polymerization method may be referred to. Preferably, salts of metal ions of Group Ia or Group IIa of the Periodic Table are used. Especially preferred are Li salts.

The integrated electroconductive material may be prepared as follows: Where the electron-conductive high polymer of the present invention is obtained by the chemical oxidation polymerization method as a powdery or bulky product, the product is shaped into a film by compression moulding and the resulting film may be stuck to a solid polyelectrolyte film under pressure to obtain the intended integrated electroconductive material. Where the electron-conductive high polymer of the present invention is obtained as an aqueous dispersion, it may be coated on a solid polyelectrolyte film by a known coating method, for example, by roller coating, spin coating, dip coating or spray coating method or by a known extrusion coating method, and the coated layer may be dried by a known drying method.

Alternatively, a solid polyelectrolyte is dissolved or melted and the resulting solution or molten liquid may be applied to the electron-conductive high polymer film of the present invention as formed on an electrode by the electrolytic oxidative polymerization method or on the polymer film as filmed by the above-mentioned means, to thereby form a laminate structure film.

The electron-conductive high polymer of the present invention may be used in combination with an organic solvent such as an alkali metal salt-containing propylene carbonate or gamma-butyrolactone.

As the compound of the present invention has a function of a solid polyelectrolytes e.g., ion-conductive property, the electroconductive laminate material of the present invention may not have an electrolyte layer.

For instance, only a separator may be provided between the positive pole (made of the compound of the present invention) and the negative pole, and the resulting laminate may function as a battery.

For preparing the integrated material of the present invention, the constitutive components are previously separately prepared and then they are laminated; or alternatively, a positive pole material is first coated or applied to a separator and then a negative pole material may then be applied to the resulting integrated component.

It is preferred that an organic solvent (for example, propylene carbonate, ethylene carbonate, gammabutyrolactone, dimethoxyethane or methyltetrahydrofuran) is previously infiltrated into the separator to be used for the purpose, in order that the ion of the negative pole material (for example, $Li^+$) may be diffused into the separator with ease.

The organic solvent may contain a lithium salt. As the material for the separator, anyone of polyolefins, polyesters, vinyl chloride, fluoro-resins, polyamides, polysulfones, celluloses or polyurethanes may be used. The separator may be treated by plasma treating, glow treating, radiation treating, plasma polymerization treating, plasma-initiation polymerization treating, radiation polymerization treating or radiation-initiation polymerization treating.

Next, specific examples of the compounds of the present invention as well as examples of preparation of the compounds are mentioned below. However, the present invention is not limited to only the compounds illustrated below.

SYNTHESIS EXAMPLE 1

Production of Compound No. 1 of the Invention 21.5 g of o-nitrophenethyl alcohol, 100 ml of acetonitrile and 11.7 g of pyridine were stirred with cooling under freezing point, whereupon 15.3 g of methacryloyl chloride was dropwise added thereto over a period of 30 minutes. After the whole was stirred for further one hour, 200 ml of ethyl acetate and 300 ml of water were added thereto, and the ethyl acetate layer was extracted out. This was washed with 300 ml of water, and an ethyl acetate solution containing o-nitrophenethyl methacrylate (1-A) was obtained.

50 g of reduced iron, 0.5 g of ammonium chloride, 30 ml of water, 200 ml of ethanol and 1 g of acetic acid were heated up to 75° C with stirring. The previously prepared ethyl acetate solution (1-A) was dropwise added to the resulting aqueous solution over a period of one hour and then the whole was stirred for further 3 hours. The insoluble substance in the reaction mixture was removed by filtration, and the resulting filtrate was concentrated and purified through silica gel column using chloroform as a developer solvent. As a result, 23 g of o-aminophenethyl methacrylate (1-B) was obtained. The structure of the product was confirmed by NMR and elementary analysis.

0.005 mol of (1-B), 0.095 mol of Monomer (III-2) and 100 ml of ethanol were stirred at 70° C, whereupon 0.5 g of azoisobutyronitrile was added thereto and stirred for 6 hours. As a result, prepolymer (1-C) was obtained. By NMR and elementary analysis, the structure of (1-C) was confirmed to be as follows:

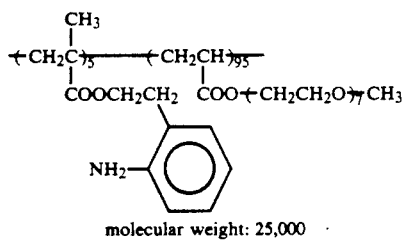

molecular weight: 25,000

20 g of (1-C), 20 g of aniline, 7.5 g of LiClO$_4$, 20 g of CF$_3$COOH and 500 ml of acetonitrile were stirred and subjected to electrolytic polymerization for 1 hour by a constant voltage method (3 V, 2 mA/cm$^2$), using Pt plates for the positive and negative poles. As a result, a polymer precipitate was formed on the negative pole. By elementary analysis, Compound No. 1 of the invention thus prepared had a structural formula of:

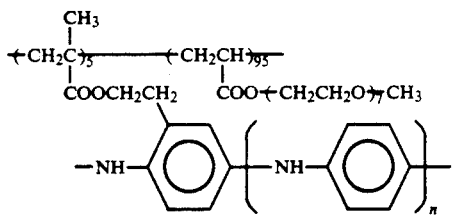

where n was 38.3 as an average, and molecular weight (calculated) was 28,500.

SYNTHESIS EXAMPLE 2

Production of Compound No. 2 of the Invention 20 g of (1-C) obtained in Synthesis Example 1, 20 g of pyrrole, 15 g of LiClO$_4$ and one liter of water were stirred at 20° C., whereupon 170 g of FeCl$_3$·6H$_2$O was gradually added thereto. After addition, the whole was stirred for further one hour, and the product was collected by filtration. This was washed with water and dried to obtain Compound No. 2 of the invention.

By elementary analysis, Compound No. 2 of the invention was found to have a structural formula of:

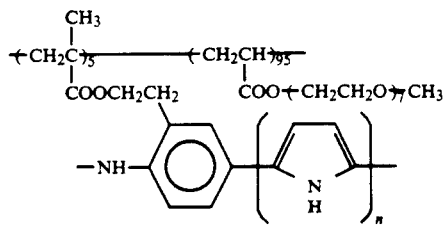

where n was 51 as an average, and molecular weight (calculated) was 28,300.

SYNTHESIS EXAMPLE 3

Production of Comparative Compound No. 1

20 g of aniline, 15 g of LiClO$_4$, 20 g of CF$_3$COOH and 500 ml of acetonitrile were stirred and subjected to electrolytic polymerization for 1 hour by a constant voltage method (3 V, 2 mA/cm$^2$), using Pt plates for the positive and negative poles. As a result, a precipitate (Comparative Compound No. 1) was formed on the negative pole.

SYNTHESIS EXAMPLE 4

Production of Comparative Compound No. 2

0.005 mol of (1-B) prepared in Synthesis Example 1, 0.095 mol of n-butyl acrylate and 100 ml of ethyl acetate were stirred at 70° C., whereupon 0.5 g of azoisobutyronitrile was added thereto. The resulting mixture was stirred for further 6 hours, to obtain a prepolymer (4-C) (molecular weight.,21,000).

20 g of (4-C), 20 g of aniline, 15 g of LiClO$_4$, 20 g of CF$_3$COOH and 500 ml of acetonitrile were stirred and subjected to electrolytic polymerization for 1 hour by a constant voltage method (3 V, 2 mA/cm$^2$), using Pt plates for the positive and negative poles. As a result, a precipitate (Comparative Compound No. 2) was formed on the negative pole.

By elementary analysis, Comparative Compound No. 2 was found to have a structural formula of:

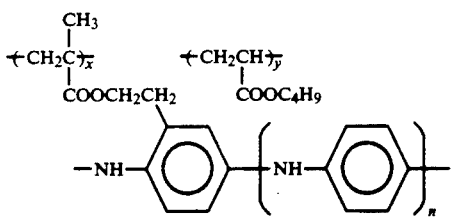

where x/y was 6/94 (by mol), n was 24 as an average, and molecular weight (calculated) was 22,200.

SYNTHESIS EXAMPLE 5

Production of Compound No. 3 of the Invention 0.1 mol of 2-bromo-4-2-hydroxyethoxymethylthiophene, 0.1 mol of pyridine and 100 ml of acetonitrile were stirred at not more than 10° C., whereupon 0.1 mol of methacryloyl chloride was dropwise added thereto over a period of 30 minutes. After stirred for 1 hour, 200 ml of ethyl acetate and 200 ml of water were added to the reaction mixture. The ethyl acetate layer was extracted out, concentrated and then purified by column purification, to obtain 22.1 g of 2-bromo-4-thienylmethoxyethyl methacrylate (I-A).

10 g of (I-A), 50 g of (III-1), 10 g of (IV-3 M=H), 300 ml of ethanol and 0.6 g of 2,2'-azobismethyl isobutyrate were stirred at 80° C. in a nitrogen stream for 5 hours. After the mixture was concentrated to remove ethanol, one liter of nitrobenzene and 1.5 mols of silver trichloride were added thereto, and 0.5 mol of 2-chlorothiophene was dropwise added thereto at 100° C. in a nitrogen gas stream over a period of one hour. After addition, the whole was stirred for 6 hours at 60° C. and then concentrated to remove nitrobenzene. To this was added 500 ml of ethanol. Compound (I) was extracted out under heat. After purification through a Sephadex column, 3.53 g of Compound No. 3 of the invention was obtained.

By elementary analysis and NMR, Compound No. 3 of the invention thus prepared was found to have a structural formula of:

where x/y/z was 15/70/15, n was 11.6 as an average and molecular weight (calculated) was 23,500.

SYNTHESIS EXAMPLE 6

In accordance with Synthesis Example 1, Compounds Nos. 4 to 20 of the invention were prepared.

SYNTHESIS EXAMPLE 7

Production of Comparative Compound No. 3

Comparative Compound No. 3 was prepared in the same manner as in Synthesis Example 3, except that aniline was replaced by pyrrole.

SYNTHESIS EXAMPLE 8

Production of Comparative Compound No. 5

Polyisothianaphthene (Comparative Compound No. 5 was prepared in accordance with Example 2 of JP-A-63-215772, using sodium p-styrenesulfonate and isothianaphthene.

| Compounds of the Invention | A | B | C | D | x/y/z/w (by mol) | n (Average) | Molecular Weight (Calculated) |
|---|---|---|---|---|---|---|---|
| | | | $-(A)_{\overline{x}}-(B)_{\overline{y}}-(C)_{\overline{z}}-(D)_{\overline{w}}-$ | | | | |
| 4 | I-1 | III-1 | IV-1 | — | 5/85/10/— | 53 | 24,000 |
| 5 | I-1 | III-4 | IV-1 | $-(CH_2-CH)-$ with phenyl | 2/60/15/23 | 83 | 18,500 |
| 6 | I-2 | III-7 | $-CH_2C(CH_3)(COOCH_3)-$ | — | 4/66/30/— | 60 | 19,800 |
| 7 | I-3 | III-8 | IV-3 | — | 5/82/13/— | 46 | 20,500 |
| 8 | I-4 | III-9 | — | — | 5/95/—/— | 55 | 25,500 |
| 9 | I-5 | III-2 | IV-1 | — | 1/80/19/— | 120 | 38,000 |
| 10 | I-6 | III-1 | IV-3 | — | 5/75/20/— | 43 | 24,000 |
| 11 | I-7 | III-15 | $-(CH_2-CH)-$ with $COOC_4H_9$ | — | 3/65/32 | 51 | 22,000 |
| 12 | I-10 | III-2 | IV-3 | $-(CH_2-C(CH_3)(COOCH_3))-$ | 8/50/15/27 | 37 | 27,000 |
| 13 | I-11 | III-1 | $-(CH_2-CH)-$ with $CONH_2$ | — | 5/60/35/— | 58 | 30,500 |
| 14 | I-12 | III-3 | — | — | 15/85/—/— | 36 | 29,200 |
| 15 | I-15 | III-7 | — | — | 5/95/—/— | 72 | 22,700 |
| 16 | I-16 | III-13 | — | — | 5/95/—/— | 50 | 25,000 |
| 17 | I-1 | I-16 (m = 7) | III-2 | IV-1 | 2/3/75/20 | 47 | 27,100 |
| 18 | I-1 | I-5 | III-2 | — | 3/1/78/18 | 44 | 25,800 |
| 19 | I-2 | III-1 | III-2 | — | 5/50/45/— | 52 | 20,700 |
| 20 | I-2 | III-1 | III-2 | IV-3 | 3/35/35/27 | 50 | 23,900 |

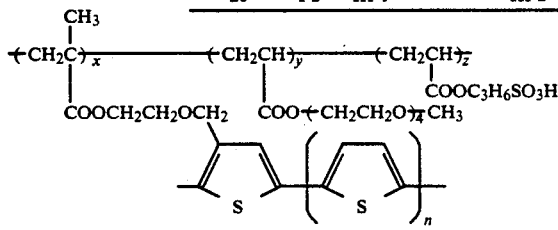

SYNTHESIS EXAMPLE 21

Production of Compound No. 1', of the Invention 21.5 g of o-nitrophenethyl alcohol, 100 ml of acetonitrile and 11.7 g og pyridine were stirred with cooling under freezing point, whereupon 15.3 g of methacyloyl chloride was dropwise added thereto over period of 30 minutes. The mixture was stirred for further one hour and 200 ml of ethyl acetate and 300 m of water were added thereto, and the resulting ethyl acetate phase was extracted. This was washed with 300 ml of water to obtain and ethyl acetate solution containing o-nitrophenethyl methacrylate (1-A).

50 g of reduced iron, 0.5 g of ammonium chloride, 30 ml of water, 200 ml of ethanol and 1 g of acetic acid were heated up to 75° C. with stirring. The previously prepared ethyl acetate solution (1-A) was dropwise added to the resulting aqueous solution over a period of one hour and then the whole was stirred for further 3 hours. The insoluble substance in the reaction mixture was removed by filtration, and the resulting filtrate was concentrated and purified through silica gel column using chloroform as a developer solvent. As a result, 23 g of o-aminophenethyl methacrylate (1-B) was obtained. The structure of the product was confirmed by NMR and elementary analysis.

0.005 mol of (1-B), 0.095 mol of Monomer (IV-2, M=H) and 100 ml of ethanol were stirred at 70° C., whereupon 0.5 g of azoisobutyronitrile was added thereto and stirred for 6 hours. As a result, prepolymer (1-C') was obtained. By NMR and elementary analysis, the structure of (1-C') was confirmed to be as follows:

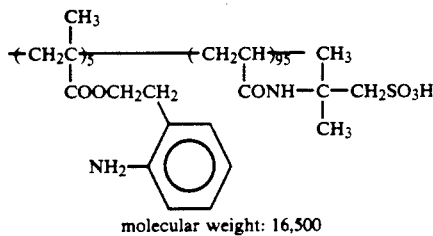

molecular weight: 16,500

20 g of (1-C'), 20 g of aniline and 500 ml of water was stirred and subjected to electrolytic polymerization for 1 hour by a constant voltage method (3V, 2 mA/cm$^2$), using Pt plates for the positive and negative poles. As a result, a polymer precipitate was formed on the negative pole. By elementary analysis, Compound No. 1' of the invention thus prepared had a structural formula of:

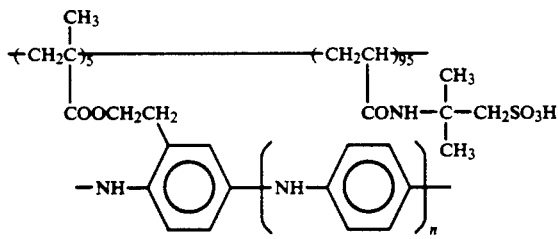

where n was 40.6 as an average and molecular weight (calculated) was 20,200.

SYNTHESIS EXAMPLE 22

Production of Compound No. 2', of the Invention 20 g of (1-C') obtained in Synthesis Example 21, 20 g of pyrrole, 15 g of LiClO$_4$ and one liter of water were stirred at 20° C., whereupon 170 g of FeCl$_3$·6H$_2$O was gradually added thereto. After addition, the whole was stirred for further one hour, and the product was collected by filtration. This was washed with water and dried to obtain Compound No. 2' of the invention.

By elementary analysis, Compound No. 2' of the invention was found to have a structural formula of:

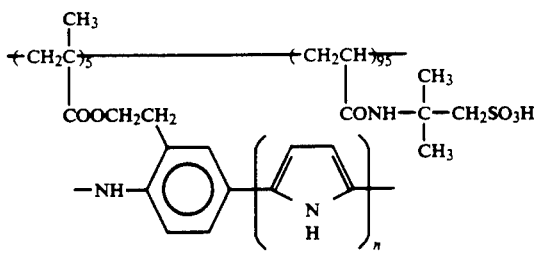

where n was 59 as an average and molecular weight (calculated) was 20,300.

SYNTHESIS EXAMPLE 23

Production of Compound No. 3', of the Invention 0.1 mol of 2-bromo-4-2-hydroxyethoxymethylthiophene, 0.1 mol of pyridine and 100 ml of acetonitrile were stirred at 10° C. or lower, whereupon 0.1 mol of methacryloyl chloride was dropwise added thereto over a period of 30 minutes. After stirred for 1 hour, 200 ml of ethyl acetate and 200 ml of water were added to the reaction mixture. The ethyl acetate phase was extracted-out, concentrated and then purified by column purification, to obtain 22.1 g of 2-bromo-4-thienylmethoxyethyl methacrylate (I-A).

10 g of (I-A), 20 g of n-butyl acrylate, 10 g of Monomer (IV-3, M=H), 300 ml of ethanol and 0.6 g of 2,2'-azobismethyl isobutyrate were stirred at 80° C. in a nitrogen stream for 5 hours. After the mixture was concentrated to remove ethanol, one liter of nitrobenzene and 1.5 mols of silver trichloride were added thereto, and 0.5 mol of 2-chlorothiophene was dropwise added thereto at 100.C in a nitrogen stream over a period of one hour. After addition, the whole was stirred for 6 hours at 60° C. and then concentrated to remove nitrobenzene. To this was added 500 ml of ethanol. Compound (I') was extracted out under heat. After purification through a Sephadex column, 3.53 g of Compound No. 3' of the invention was obtained.

By elementary analysis and NMR, Compound No. 3' of the invention thus prepared was found to have a structural formula of:

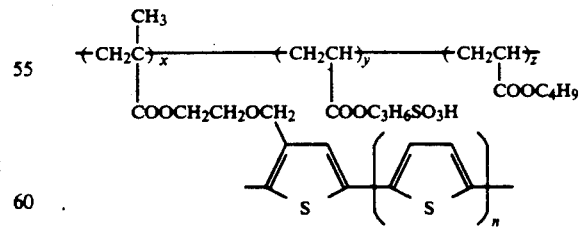

where x/y/z was 33/18/49 (by mol), n was 13.2 as an average and molecular weight (calculated) was 21,100.

SYNTHESIS EXAMPLE 24

In accordance with Synthesis Example 21, Compounds Nos. 4' to 20, of the invention were prepared.

SYNTHESIS EXAMPLE 25

Production of Comparative Compound No. 6

Comparative Compound No. 6 was prepared in the same manner as in Synthesis Example 3, except that polystyrenesulfonic acid was used in place of $LiClO_4$.

EXAMPLES

MEASUREMENT OF ELECTRIC CONDUCTIVITY

Each of Compounds Nos. 1, 2, 5, 7, 9, 15, 18, 20, 1', 2,', 5', 7', 9', 15', 16' and 20' of the present invention and $$-(A)_{\overline{x}}-(B)_{\overline{y}}-(C)_{\overline{z}}-(D)_{\overline{w}}-$$

| Compounds of the Invention | A | B | C | D | x/y/z/w (by mol) | n (Average) | Molecular Weight (Calculated) |
|---|---|---|---|---|---|---|---|
| 4' | I-1 | IV-1 | — | — | 6/94/—/— | 55 | 23,000 |
| 5' | I-1 | IV-2 | $-(CH_2-C(CH_3)(COOCH_3))-$ | — | 2/55/43/— | 60 | 20,500 |
| 6' | I-2 | IV-1 | — | — | 3/97/—/— | 81 | 21,700 |
| 7' | I-3 | IV-2 | — | — | 4/96/—/— | 63 | 24,500 |
| 8' | I-4 | IV-3 | $-(CH_2-CH(C_6H_5))-$ | $-(CH_2-CH(COOC_4H_9))-$ | 3/30/32/35 | 98 | 27,800 |
| 9' | I-5 | IV-4 | $-(CH_2-CH(COOC_2H_5))-$ | — | 5/65/30/— | 39 | 26,200 |
| 10' | I-6 | IV-5 | $-(CH_2-CH(COOC_4H_9))-$ | — | 1/35/64/— | 115 | 31,000 |
| 11' | I-7 | IV-6 | — | — | 5/95/—/— | 43 | 24,800 |
| 12' | I-10 | IV-7 | $-(CH_2-CH(C_6H_4CONH_2))-$ | — | 5/46/49/— | 58 | 21,800 |
| 13' | I-11 | IV-8 | $-(CH_2-CH(CONH_2))-$ | $-(CH_2-CH(CON(morpholino)))-$ | 8/33/28/31 | 55 | 24,500 |
| 14' | I-12 | IV-1 | — | — | 15/85/—/— | 32 | 26,200 |
| 15' | I-15 (m = 4) | IV-2 | $-(CH_2-CH(COOC_2H_4OCH_3))-$ | — | 2/40/58/— | 72 | 19,800 |
| 16' | I-16 (m = 7) | IV-1 | $-(CH_2-CH(COOC_2H_4OCH_3))-$ | — | 3/45/52/— | 58 | 20,800 |
| 17' | I-19 | IV-1 | — | — | 5/95/—/— | 51 | 22,500 |
| 18' | I-23 | IV-2 | — | — | 7/93/—/— | 43 | 23,800 |
| 19' | I-1 | I-16 (m = 7) | IV-1 | — | 3/2/95/— | 45 | 24,000 |
| 20' | I-1 | I-5 | IV-2 | — | 3/2/95/— | 48 | 21,000 |

Next, the present invention will be explained in more detail by way of the following examples, which, however, are not intended to restrict the scope of the present invention.

Comparative Compounds Nos. 1, 2, 3, 5, and 6 was powdered and shaped under pressure to for a plate having a thickness of 0.2 mm. On the other hand, Comparative Compound No. 1 and polyethylene oxide (average molecular weight: 30,000) were well blended and the resulting blend (Comparative Compound No. 4)

was also shaped into a plate having the same thickness in the same manner as above. The electric conductivity of each plate was measured using Loresta AP manufactured by Mitsubishi Yuka Co., Ltd., and the results obtained are shown in Table A below.

SCRATCH-RESISTANCE TEST

Each plate prepared as above was subjected to a scratch-resistance test using a 1 mm-diameter sapphire needle, where the load as imparted to the needle under which the plate was broken and scratched was measured. The load indicates the scratch-resistant strength. The results obtained are shown in Table 1 and Table A.

MEASUREMENT OF ELECTROCONDUCTIVITY OF LAMINATE MATERIAL

Each plate prepared as above was combined with a cast film of a solid polyelectrolyte (thickness: about 200 microns) and the two were then sandwiched between stainless steel plates to prepare a laminate material. The electroconductivity of the thus prepared laminate material was measured (Cole-Cole plot method), and the results obtained are shown in Table 1 and Table A.

SAID ELECTROLYTE FILM 1 g of $CH_2=CH-COO(C_2H_4O)_9-CO-CH=CH_2$, 6 g of propylene carbonate, 1.5 g of $LiClO_4$ and 10 mg of azoisobutyronitrile were dissolved in acetone, cast on a Teflon plate and then polymerized thereon at 80° C. for 4 hours to form a solid polyelectrolyte film. (The electroconductivity of the film as obtained by Cole-Cole plot method was $3 \times 10^{-3} S/cm^2$.)

REPEATED CHARGE-DISCHARGE TEST 1

A lithium sheet was attached to the laminate material obtained as above, under pressure, and put in a stainless steel case. The case was then sealed with an insulating synthetic rubber and shaped under compression to form a battery as shown in FIG. 1. The battery is a secondary battery, and this was subjected to a repeated charge-discharge test, where the average voltage after 100 cycles or 10 cycles was measured at 20° C. and −25° C. The results obtained are shown in Table 1 and Table A.

TABLE 1

| Sample | Electric Conductivity ($S/cm^2$) | Scratch-Resistance (g) | Electroconductivity of Laminate Material ($S/cm^2$) | Charge-Discharge Characteristics (V) | | | | | |
|---|---|---|---|---|---|---|---|---|---|
| | | | | 20° C. | | | −25° C. | | |
| | | | | Initial Voltage | Average Voltage | | Initial Voltage | Average Voltage | |
| | | | | | 1st Cycle | 100th Cycle | | 1st Cycle | 100th Cycle |
| Compounds of the Invention | | | | | | | | | |
| 1 | 0.4 | >200 | $1.2 \times 10^{-4}$ | 3.68 | 2.66 | 2.65 | 3.63 | 2.61 | 2.55 |
| 2 | 3.1 | >200 | $6.8 \times 10^{-4}$ | 3.60 | 2.57 | 2.55 | 3.58 | 2.51 | 2.40 |
| 5 | 0.5 | >200 | $1.0 \times 10^{-4}$ | 3.71 | 2.67 | 2.65 | 3.63 | 2.60 | 2.58 |
| 7 | 0.7 | >200 | $1.8 \times 10^{-4}$ | 3.66 | 2.61 | 2.59 | 3.60 | 2.53 | 2.51 |
| 9 | 3.2 | >200 | $5.7 \times 10^{-4}$ | 3.55 | 2.59 | 2.57 | 3.48 | 2.50 | 2.47 |
| 15 | 4.0 | >200 | $8.1 \times 10^{-4}$ | 3.60 | 2.62 | 2.60 | 3.51 | 2.50 | 2.38 |
| 18 | 2.1 | >200 | $5.3 \times 10^{-4}$ | 3.65 | 2.68 | 2.62 | 3.58 | 2.58 | 2.43 |
| 20 | 0.5 | >200 | $1.6 \times 10^{-4}$ | 3.76 | 2.59 | 2.57 | 3.66 | 2.63 | 2.61 |
| Comparative Compounds | | | | | | | | | |
| 1 | 0.4 | <50 | $5.0 \times 10^{-5}$ | 3.54 | 2.55 | 2.44 | 3.41 | 2.45 | 1.87 |
| 2 | 0.3 | >200 | $8.3 \times 10^{-5}$ | 3.63 | 2.61 | 2.58 | 3.58 | 2.51 | 2.13 |
| 3 | 3.2 | <50 | $2.3 \times 10^{-4}$ | 3.54 | 2.51 | 2.38 | 3.48 | 2.40 | 1.69 |
| 4 | $2 \times 10^{-4}$ | <50 | $7.3 \times 10^{-7}$ | — | — | — | — | — | — |
| 5 | 0.2 | <50 | $6.1 \times 10^{-5}$ | 3.48 | 3.21 | 1.85 | 3.30 | 1.88 | 1.25 |

TABLE A

| Sample | Electric Conductivity ($S/cm^2$) | Scratch-Resistance (g) | Electroconductivity of Laminate Material ($S/cm^2$) | Charge-Discharge Characteristics (V) | | | | | |
|---|---|---|---|---|---|---|---|---|---|
| | | | | 20° C. | | | −25° C. | | |
| | | | | Initial Voltage | Average Voltage | | Initial Voltage | Average Voltage | |
| | | | | | 1st Cycle | 100th Cycle | | 1st Cycle | 100th Cycle |
| Compounds of the Invention | | | | | | | | | |
| 1' | 0.5 | >200 | $1.1 \times 10^{-4}$ | 3.63 | 2.61 | 2.59 | 3.58 | 2.59 | 2.40 |
| 2' | 2.8 | >200 | $5.3 \times 10^{-4}$ | 3.58 | 2.55 | 2.48 | 3.51 | 2.50 | 2.30 |
| 5' | 0.6 | >200 | $9.3 \times 10^{-5}$ | 3.73 | 2.67 | 2.63 | 3.65 | 2.63 | 2.47 |
| 7' | 0.5 | >200 | $1.5 \times 10^{-4}$ | 3.68 | 2.63 | 2.59 | 3.60 | 2.55 | 2.30 |
| 9' | 3.3 | >200 | $6.1 \times 10^{-4}$ | 3.53 | 2.58 | 2.55 | 3.40 | 2.42 | 2.28 |
| 15' | 4.2 | >200 | $9.5 \times 10^{-4}$ | 3.61 | 2.66 | 2.65 | 3.58 | 2.60 | 2.58 |
| 16' | 0.7 | >200 | $3.1 \times 10^{-4}$ | 3.66 | 2.63 | 2.58 | 3.61 | 2.55 | 2.43 |
| 20' | 1.8 | >200 | $3.1 \times 10^{-4}$ | 3.58 | 2.57 | 2.55 | 3.54 | 2.53 | 2.41 |
| Comparative Compounds | | | | | | | | | |
| 1 | 0.4 | <50 | $5.0 \times 10^{-5}$ | 3.54 | 2.55 | 2.44 | 3.41 | 2.45 | 1.87 |
| 2 | 0.3 | >200 | $8.3 \times 10^{-5}$ | 3.63 | 2.61 | 2.58 | 3.58 | 2.51 | 2.13 |
| 3 | 3.2 | <50 | $2.3 \times 10^{-4}$ | 3.54 | 2.51 | 2.38 | 3.48 | 2.40 | 1.69 |
| 6 | 0.3 | <50 | $7.3 \times 10^{-5}$ | 3.51 | 2.53 | 2.41 | 3.42 | 2.38 | 1.72 |
| 5 | 0.2 | <50 | $6.1 \times 10^{-5}$ | 3.48 | 2.21 | 1.85 | 3.30 | 1.88 | 1.25 |

REPEATED CHARGE-DISCHARGE TEST 2

Figure 2:
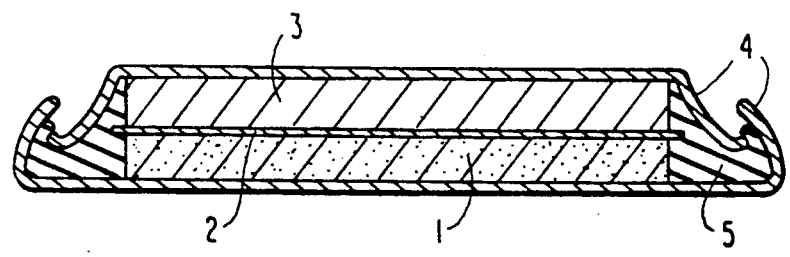
FIG. 2 is a sectional view to show the constitution of a secondary battery as prepared in the repeated charge-discharge test No. 2 of the present invention, wherein 1 represents a positive pole made of the compound of the invention, 2 represents a separator, 3 represents a negative pole (lithium sheet), 4 represents a stainless steel case, and 5 represents an insulating synthetic rubber.

Each plate prepared as above was dipped in a 20% LiClO$_4$ acetonitrile-propylene carbonate solution (acetonitrile/propylene carbonate 80/20) and then dried. This was laminated with a propylene carbonate-infiltrated separator (polypropylene) and a lithium sheet and the resulting laminate was put in a stainless steel case. Then the case was sealed with an insulating synthetic rubber and shaped under compression to prepare a battery as shown in FIG. 2. The battery is a secondary battery, and this was subjected to a repeated charge-discharge test, where the average voltage after 10 cycles was measured at 20° C. The results obtained are shown in Table 2 below.

MOLECULAR WEIGHT (WEIGHT AVERAGE MOLECULAR WEIGHT)

The molecular weight was obtained using gel-permeation chromatography (GPC). The measurement was carried out under the condition HLC 8020-type GPC, made by Toyosoda Co., Ltd., using two separation columns, TSK-GEL (4,000H and 2,000H) made by Toyosoda Co., Ltd. and dissolution liquid THF (velocity 1.0 ml/min, column Temp. 40° C.) or acetonitrile/water (2 : 8) (velocity 1.0 ml/min, column Temp. 40° C.), by measuring absorption wave length of UV absorption (254 nm). As a standard, polystyrene was used.

TABLE 2

| Sample | Charge-Discharge Characteristics (V), 20° C. | | |
|---|---|---|---|
| | Initial Voltage | 1st Cycle | 10th Cycle |
| Compounds of the Invention | | | |
| 1 | 3.60 | 2.60 | 2.58 |
| 2 | 3.55 | 2.53 | 2.52 |
| 5 | 3.63 | 2.58 | 2.57 |
| 7 | 3.62 | 2.57 | 2.56 |
| 9 | 3.56 | 2.60 | 2.58 |
| 15 | 3.57 | 2.43 | 2.35 |
| 18 | 3.60 | 2.55 | 2.50 |
| 20 | 3.62 | 2.61 | 2.60 |
| Comparative Compounds | | | |
| 1 | This did not function as a battery. | | |
| 2 | " | | |
| 3 | " | | |
| 4 | " | | |
| 5 | " | | |

Where Comparative Compound No. 4 used, the sample obtained did not function as a battery. Regarding the results of Table 1 and Table A above, Compounds Nos. 1, 5, 7, 18 and 20 of the invention were compared with Comparative Compounds Nos. 1, 2, 4 and 5, Compounds Nos. 2, 9 and 15 of the invention with Comparative Compounds Nos. 3 and 5, Compounds Nos. 1', 5', 7' and 16' of the invention with Comparative Compounds No. 1, 2 and 6, and Compounds Nos. 2' and 15' with Comparative Compound No. 3. From the comparison, it is obvious that the compounds of the present invention have a higher mechanical strength with still having a sufficient electroconductivity, than the comparative compounds. Additionally, it is also obvious that the laminate material having the compound of the present invention has a small interfacial resistance and therefore has an excellent charge-discharge characteristic as a secondary battery material.

In particular, it has been clarified that the compounds of the present invention which have both an ethylenic repeating unit having a repeating unit of an oxyalkylene group in the side chain and an ethylenic repeating unit having an anionic group in the side chain (Compounds Nos. 5, 7, 9 and 20) have especially excellent properties.

While the invention has been described in detail and with reference to specific embodiments thereof, it will be apparent to one skilled in the art that various changes and modifications can be made therein without departing from the spirit and scope thereof.

What is claimed is:

1. An electron-conductive high polymer which has at least (1) an ethylenic repeating unit having an electron-conductive site comprising at least one of aniline compounds and heterocyclic compounds as the repeating unit in the side chain and (2) at least one ethylenic repeating unit selected from the group consisting of an ethylenic repeating unit having an anionic group in the side chain and an ethylenic repeating unit having a repeating unit of an oxyalkylene group in the side chain, wherein the ethylenic repeating unit (1) having an electron-conductive site is derived from an ethylenic compound of formula (I) or (II):

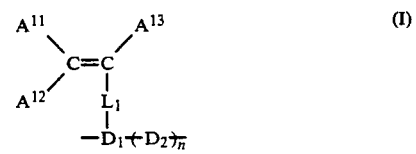

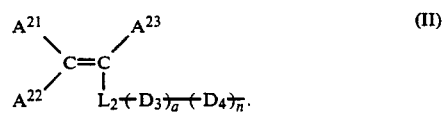

wherein $A^{11}$, $A^{12}$, $A^{13}$, $A^{21}$, $A^{22}$ and $A^{23}$ may be the same or different and each represent a hydrogen atom or a substituent on the ethylenic carbon;

$L_1$ and $L_2$ may be the same or different and each represents a divalent linking group;

$D_1$, $D_2$, $D_3$ and $D_4$ may be the same or different and each represents a residue of an aniline compound or a heterocyclic compound; and a represents 0 or 1, wherein the ethylenic repeating unit (2) having a repeating unit of an oxyalkylene group in the side chain is derived from an ethylenic compound of formula (III):

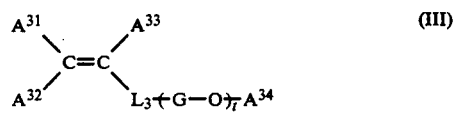

wherein $A^{31}$, $A^{32}$ and $A^{33}$ may be the same or different and each represents a hydrogen atom or a substituent on the ethylene carbon;

$A^{34}$ represents a hydrogen atom, a substituted or unsubstituted alkyl, a substituted or unsubstituted aryl, a substituted or unsubstituted alkylcarbonyl, a substituted or unsubstituted arylcarbonyl, a substituted or unsubstituted alkylsulfonyl or a substituted or unsubstituted arylsulfonyl group;

$L_3$ represents a divalent linking group;

G represents a substituted or unsubstituted alkylene group; and t represents from 2 to 30, provided that plural G's may be the same or different, and wherein the ethylenic repeating unit (2) having an anionic group in the side chain is derived from an ethylenic compound of formula (IV):

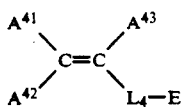

where $A^{41}$, $A^{42}$ and $A^{43}$ may be the same or different and each represents a hydrogen atom or a substituent on the ethylenic carbon;

$L_4$ represents a divalent linking group; and

E represents an anionic group, and wherein said heterocyclic compound is a compound having a hetero ring selected from the group consisting of

pyrazole, imidazole, triazole, oxazole, thiazole, pyridine,
diazine,

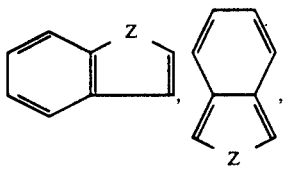

benzothiazole, purine, quinoline,
isoquinoline, benzodiazine, fluorene

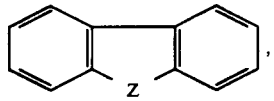

acridine,
phenazone, phenoxazone, pyrazolotrizole, pyrazolodiazole, pyrazoloazole, and benzopyrazoloazole and wherein Z represents —O—, —S— or

where $R^3$ represents a hydrogen atom, or an alkyl group having from 1 to 6 carbon atoms, n=1 to 10,000.

2. The electron-conductive high polymer as claimed in claim 1, wherein $D_1$, $D_2$, $D_3$ and $D_4$ are each selected from the group consisting of an aniline compound, a pyrrole compound, a thiophene compound and a furan compound.

3. The electron-conductive high polymer as claimed in claim 1, wherein the substituent on the ethylene carbon represented by $A^{11}$, $A^{12}$, $A^{13}$, $A^{21}$, $A^{22}$ and $A^{23}$ in the general formulae (I) and (II) each represents a substituted or unsubstituted alkyl group, having from 1 to 4 carbon atoms a cyano group, a carboxyl group, a carbamoyl group, a substituted or unsubstituted alkoxycarbonyl group having from 1 to 4 carbon atoms in alkyl moiety or a halogen atom.

4. The electron-conductive high polymer as claimed in claim 1, wherein $L_1$ and $L_2$ in the general formulae (I) and (II) each represents $+(X_1)_u(J_1—X_2)_p(J_2—X_3)_q(J_3)_r)_s$, where $J_1$, $J_2$ and $J_3$ may be the same or different and each
represents

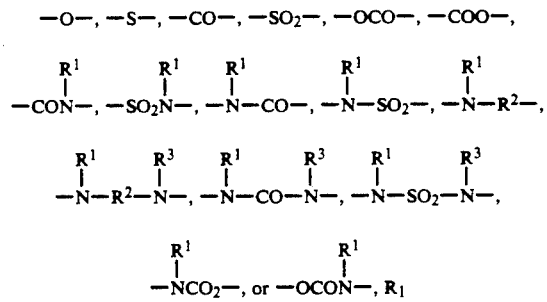

represents a hydrogen atom, or an alkyl group which may be substituted or a phenyl group which may be substituted, $R^2$ represents an alkylene group having from 1 to 4 carbon atoms, $R^3$ represents a hydrogen atom, or an alkyl group having from 1 to 6 carbon atoms which $X_1$, $X_2$ and $X_3$ may be the same or different and each may be substituted, represents an optionally substituted alkylene, arylene or aralkylene group, or —G$_1$—)$_{t1}$CH$_2$CH$_2$—, $G_1$ representing a substituted or unsubstituted alkylene group and $t_1$ representing from 1 to 30, and u, p, q, r and s each represent 0 or 1.

5. The electron-conductive high polymer as claimed in claim 1, wherein $D_1$, $D_2$, $D_3$ and $D_4$ in the general formulae (I) and (II) each represents an anilinic compound or a heterocyclic compound comprising 5- or 6-numbered ring or a condensate thereof containing at least one hetero-atom consisting of a nitrogen atom, an oxygen atom and a sulfur atom.

6. The electron-conductive high polymer as claimed in claim 1, wherein the substituent on the ethylene carbon represented by $A^{31}$, $A^{32}$ and $A^{33}$ in the general formula (III) each represents a substituted or unsubstituted alkyl group, having from 1 to 4 carbon atoms, a cyano group, a carboxyl group, a carbamoyl group, a substituted or unsubstituted alkoxycarbonyl group having from 1 to 4 carbon atoms in alkyl moiety or a halogen atom.

7. The electron-conductive high polymer as claim in claim 1, wherein $L_3$ in the general formula (III) represents $+(X_1)_u(J_1—X_2)_p(J_2—X_3)_q(J_3)_r)_s$, where $J_1$, $J_2$ and $J_3$ may be the same or different and each represents

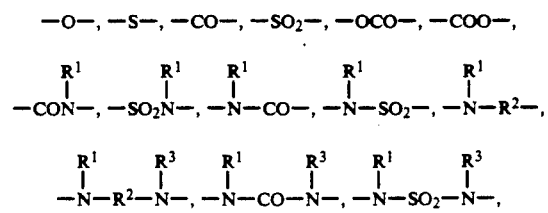

-continued

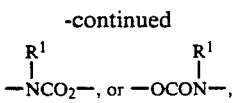

R₁ represents a hydrogen atom, or an alkyl group which may be substituted or a phenyl group which may be substituted, $R^2$ represents an alkylene group having from 1 to 4 carbon atoms, $R^3$ represents a hydrogen atom, or an alkyl group having from 1 to 6 carbon atoms which may be substituted, $X_1$, $X_2$ and $X_3$ may be the same or different and each represents an optionally substituted alkylene, arylene or aralkylene group, or $+G_1-O)_{t_1}CH_2CH_2-$, $G_1$ representing a substituted or unsubstituted alkylene group and $t_1$ representing from 1 to 30, and u, p, q, r and s each represent 0 or 1.

8. The electron-conductive high polymer as claimed in claim 1, wherein $A^{34}$ in the general formula (III) represents an alkyl group having from 1 to 3 carbon atoms.

9. The electron-conductive high polymer as claimed in claim 1, wherein G in the general formula

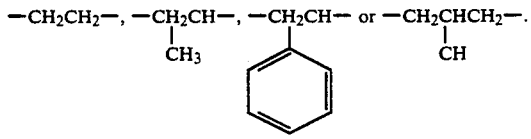

10. The electron-conductive high polymer as claimed in claim 1, wherein the substituent on the ethylene carbon represented by $A^{41}$, $A^{42}$ and $A^{43}$ in the general formula (IV) each represents a substituted or unsubstituted alkyl group, having from 1 to 4 carbon atoms, a cyano group, a carboxyl group, a carbamoyl group, a substituted or unsubstituted alkoxycarbonyl group having from 1 to 4 carbon atoms in alkyl moiety or a halogen atom.

11. The electron-conductive high polymer as claimed in claim 1, wherein $L_4$ in the general formula (IV) represents $+(X_1)_u(J_1-X_2)_p(J_2-X_3)_q(J_3)_r)_s$, where $J_1$, $J_2$ and $J_3$ may be the same or different and each represents

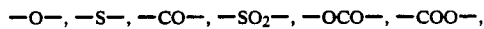

-continued

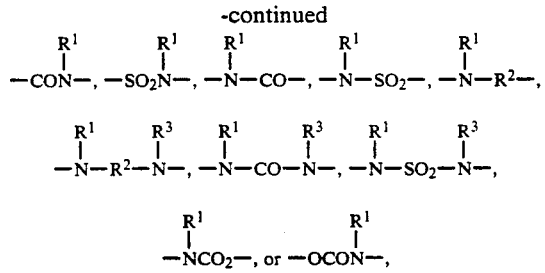

R₁ represents a hydrogen atom, or an alkyl group which may be substituted or a phenyl group which may be substituted, $R^2$ represents an alkylene group having from 1 to 4 carbon atoms, $R^3$ represents a hydrogen atom, or an alkyl group having from 1 to 6 carbon atoms which may be substituted, $X_1$, $X_2$ and $X_3$ may be the same or different and each represents an group, or $+G_1-O)_{t_1}(H_2CH_2-$, $G_1$ representing a substituted or unsubstituted alkylene group and $t_1$ representing from 1 to 30, and u, p, q, r and s each represent 0 or 1.

12. The electron-conductive high polymer as claimed in claim 1, wherein E in the general formula (IV) represents a carbonyl group and metal salts thereof, a sulfonic acid group and salts thereof, and a phosphoric acid group and salts thereof.

13. An integrated electroconductive material comprising the electron-conductive high polymer as in claim 1, wherein said electron-conductive high polymer has at least (1) an ethylenic repeating unit having an electron-conductive site comprising at least one of aniline compounds and heterocyclic compounds as the repeating unit in the side chain and (2) at least one ethylenic repeating unit selected from the group consisting of an ethylenic repeating unit having an anionic group in the side chain and an ethylenic repeating unit having a repeating unit of an oxyalkylene group in the side chain and a solid polyelectrolyte.

14. An integrated electroconductive material comprising the electron-conductive high polymer as in claim 1, wherein said electron-conductive high polymer has at least (1) an ethylenic repeating unit having an electron-conductive site comprising at least one of aniline compounds and heterocyclic compounds as the repeating unit in the side chain and (2l) at least one ethylenic repeating unit selected from the group consisting of an ethylenic repeating unit having an anionic group int he side chain and an ethylenic repeating unit having a repeating unit of an oxyalkylene group in the side chain and a separator.

* * * * *